US010049465B2

(12) United States Patent
Jain et al.

(10) Patent No.: US 10,049,465 B2
(45) Date of Patent: Aug. 14, 2018

(54) SYSTEMS AND METHODS FOR MULTI-MODALITY IMAGING COMPONENT ALIGNMENT

(71) Applicant: General Electric Company, Schenectady, NY (US)

(72) Inventors: Nitin Jain, Bangalore (IN); Neelam Sinha, Bangalore (IN); Charles Stearns, Milwaukee, WI (US)

(73) Assignee: General Electric Company, Schenectady, NY (US)

( * ) Notice: Subject to any disclaimer, the term of this patent is extended or adjusted under 35 U.S.C. 154(b) by 119 days.

(21) Appl. No.: 15/198,558

(22) Filed: Jun. 30, 2016

(65) Prior Publication Data

US 2018/0005400 A1    Jan. 4, 2018

(51) Int. Cl.
G06T 7/60    (2017.01)
G06T 7/00    (2017.01)
G06T 7/80    (2017.01)

(52) U.S. Cl.
CPC ............ G06T 7/60 (2013.01); G06T 7/0012 (2013.01); G06T 7/80 (2017.01); *G06T 2207/10081* (2013.01); *G06T 2207/10104* (2013.01)

(58) Field of Classification Search
CPC .......... G06T 7/60; G06T 7/80; G06T 7/0012; G06T 2207/10081; G06T 2207/10104
See application file for complete search history.

(56) References Cited

U.S. PATENT DOCUMENTS

| 6,856,666 B2* | 2/2005 | Lonn | A61B 6/032 378/19 |
| 6,917,666 B2 | 7/2005 | Wollenweber | |
| 7,103,233 B2 | 9/2006 | Stearns | |
| 7,569,829 B2 | 8/2009 | Chen et al. | |
| 2008/0273654 A1* | 11/2008 | Rappoport | A61B 6/037 378/18 |
| 2015/0289829 A1* | 10/2015 | Yamada | A61B 6/032 378/20 |

OTHER PUBLICATIONS

Arun, K. et al., "Least-Squares Fitting of Two 3-D Point Sets," IEEE Transactions on Pattern Analysis and Machine Intelligence, vol. PAMI-9, No. 5, Sep. 1987, 3 pages.

(Continued)

*Primary Examiner* — Siamak Harandi
(74) *Attorney, Agent, or Firm* — McCoy Russell LLP

(57) ABSTRACT

Methods and systems are provided for aligning components of a multi-modality imaging system. In one embodiment, a method comprises performing a plurality of scans of an object with a first modality and a second modality, wherein the object is positioned in a different orientation in each of the plurality of scans, calculating a plurality of alignment parameters of a first modality unit and a second modality unit based on the plurality of scans, and adjusting alignment of the first modality unit and the second modality unit based on the plurality of alignment parameters. In this way, components of a multi-modality imaging system may be accurately aligned using any phantom from which a unique line can be extracted in each modality scan.

19 Claims, 7 Drawing Sheets

(56) References Cited

OTHER PUBLICATIONS

Stearns, C. et al., "Measuring Gantry-Gantry and Gantry-Table Alignment in PET/CT," 2003 IEEE Nuclear Science Symposium Conference Record, Oct. 19, 2003, Portland, Oregon, 5 pages.
Rodriguez-Ruano, A. et al., "PET/CT Alignment for Small Animal Scanners based on Capillary Detection," 2008 IEEE Nuclear Science Symposium Conference Record (NSS '08), Oct. 19, 2008, Dresden, Germany, 4 pages.
Pascau, J. et al., "A method for small-animal PET/CT alignment calibration," Physics in Medicine and Biology, vol. 57, No. 12, Jun. 21, 2012, 9 pages.

* cited by examiner

SYSTEMS AND METHODS FOR MULTI-MODALITY IMAGING COMPONENT ALIGNMENT

FIELD

Embodiments of the subject matter disclosed herein relate to multi-modality imaging systems, and more particularly, to alignment of multi-modality imaging system components.

BACKGROUND

Multi-modality imaging systems are capable of scanning using different modalities, including but not limited to Positron Emission Tomography (PET) and Computed Tomography (CT). While some of the same hardware is utilized to perform different scans (e.g., an image produced by PET is processed and displayed respectively by the same computer and display as an image produced by CT), the data acquisition systems (hereinafter sometimes referred to as a "modality unit") are different. For example, on a CT/PET system, a radiation source and a radiation detector are used in tandem to acquire CT data, while a radiopharmaceutical is typically employed in tandem with a PET camera to acquire PET data.

In such multi-modality systems, such as an integrated PET/CT system, there is an inherent registration of the PET and CT images the system acquires. Since the patient lies still on the same table during the PET and CT portions of the acquisition, the patient will be in a consistent position and orientation during the two acquisitions, greatly simplifying the process of correlating and fusing the CT and PET images. This allows the CT image to be used to provide attenuation correction information for the reconstruction of the PET image, and allows an image reader to easily correlate the anatomic information presented in the CT image and the functional information presented in the PET image.

This inherent registration assumes a perfect alignment of the PET and CT detector coordinate systems, or at least a known spatial transformation between the two coordinate systems. Proper PET and CT image registration also requires an alignment of the axial axis of the PET and CT coordinate systems not only with each other but also with the travel axis of the table that transports the patient during the PET and CT acquisitions. Even if the CT and PET are perfectly aligned, a misaligned table will produce different artifacts in the CT and PET volumes, which cannot be properly registered.

Prior multi-modality imaging systems utilize a dedicated volumetric quality control (VQC) phantom for image alignment. These VQC phantoms typically include a number of radioactive spheres or marbles embedded within the phantom which define a number of points. The VQC phantom is scanned once using both modalities, and any misalignment between the imaging modalities may be identified in the resulting reconstructed images of the VQC phantom. In particular, the positions of the points corresponding to the radioactive spheres in the VQC phantom which appear in the PET image and the CT image, for example, are used to register the images and/or align the PET gantry with the CT gantry. However, VQC phantoms are generally large, expensive, and challenging to maintain and store, which is unnecessarily burdensome considering that VQC phantoms are only occasionally used. Accordingly, it is desirable to provide systems and methods for aligning components of a multi-modality imaging system which does not rely on a dedicated VQC phantom.

BRIEF DESCRIPTION

In one embodiment, a method comprises performing a plurality of scans of an object with a first modality and a second modality, wherein the object is positioned in a different orientation in each of the plurality of scans, calculating a plurality of alignment parameters of a first modality unit and a second modality unit based on the plurality of scans, and adjusting alignment of the first modality unit and the second modality unit based on the plurality of alignment parameters. In this way, components of a multi-modality imaging system may be accurately aligned using a simple phantom.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 9:
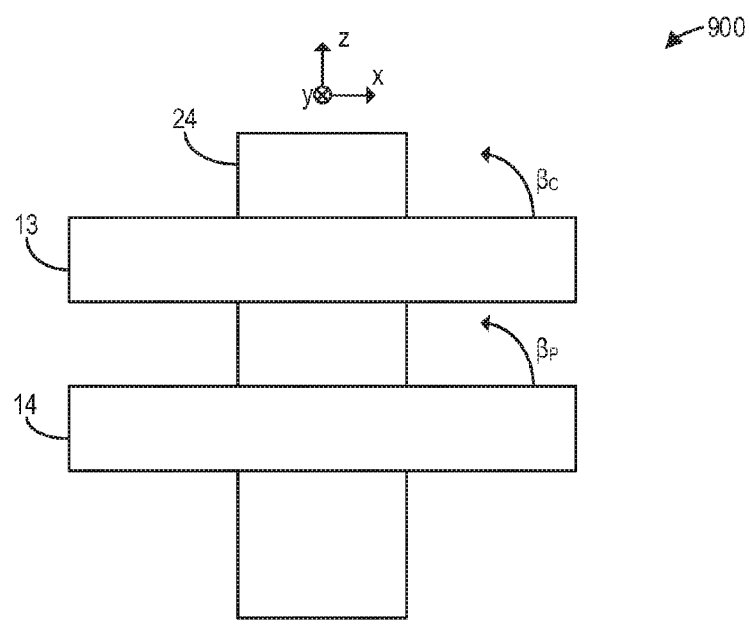
FIG. 9 shows a top view of the system shown in FIG. 1.
Figure 10:
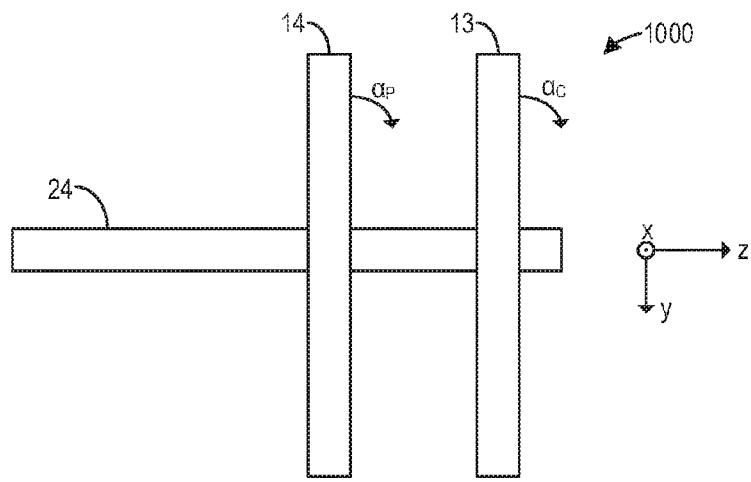
FIG. 10 shows a right-side view of the system shown in FIG. 1.
Figure 11:
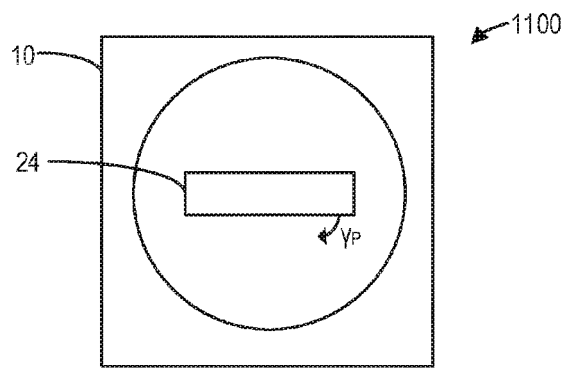
FIG. 11 shows a front view of the system shown in FIG. 1.

The following description relates to various embodiments of a multi-modality imaging system. In particular, systems and methods are provided for aligning components of a multi-modality imaging system, such as the multi-modality imaging system depicted in FIGS. 1-3. An annulus phantom, such as the phantom depicted in FIGS. 4A-4C, may be scanned in several orientations, such as the orientations depicted in FIGS. 5-7. A method for aligning imaging system components, such as the method depicted in FIG. 8, includes calculating a plurality of alignment parameters based on images reconstructed based on scans of the annulus phantom in the different orientations. The plurality of alignment parameters are depicted in FIGS. 9-11.

Though a PET/CT system is described by way of example, it should be understood that the present techniques may also be useful when applied to images acquired using other imaging modalities, such as tomosynthesis, MRI, C-arm angiography, and so forth. The present discussion of a PET/CT imaging modality is provided merely as an example of one suitable imaging multi-modality.

Further, though an annulus phantom is described by way of example, it should be appreciated that the present techniques may also be useful when applied to any phantom from which a center line may be extracted in each modality scan.

As used herein, the phrase "reconstructing an image" is not intended to exclude embodiments of the present disclosure in which data representing an image is generated but a viewable image is not. Therefore, as used herein the term "image" broadly refers to both viewable images and data representing a viewable image. However, many embodiments generate, or are configured to generate, at least one viewable image.

Figure 1:
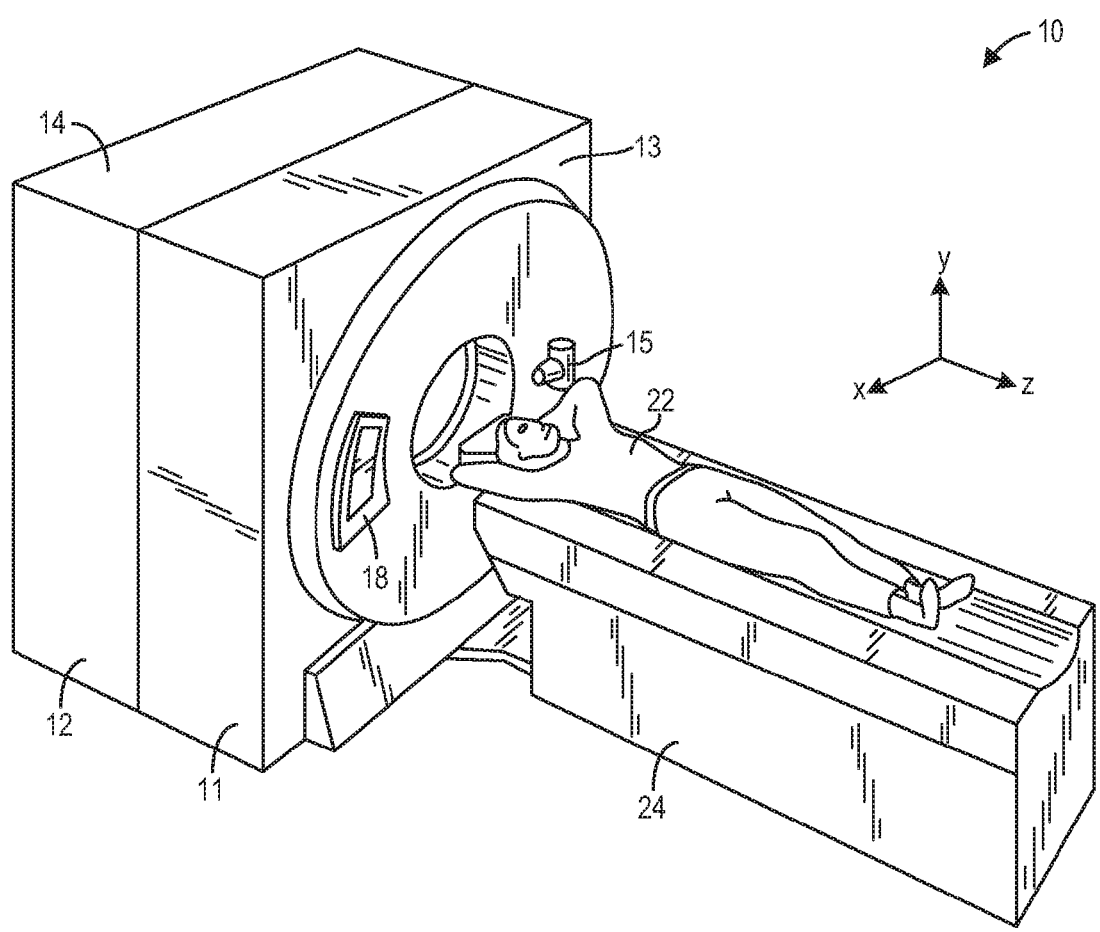
FIG. 1 shows a pictorial view of an exemplary multi-modal imaging system.
Figure 2:
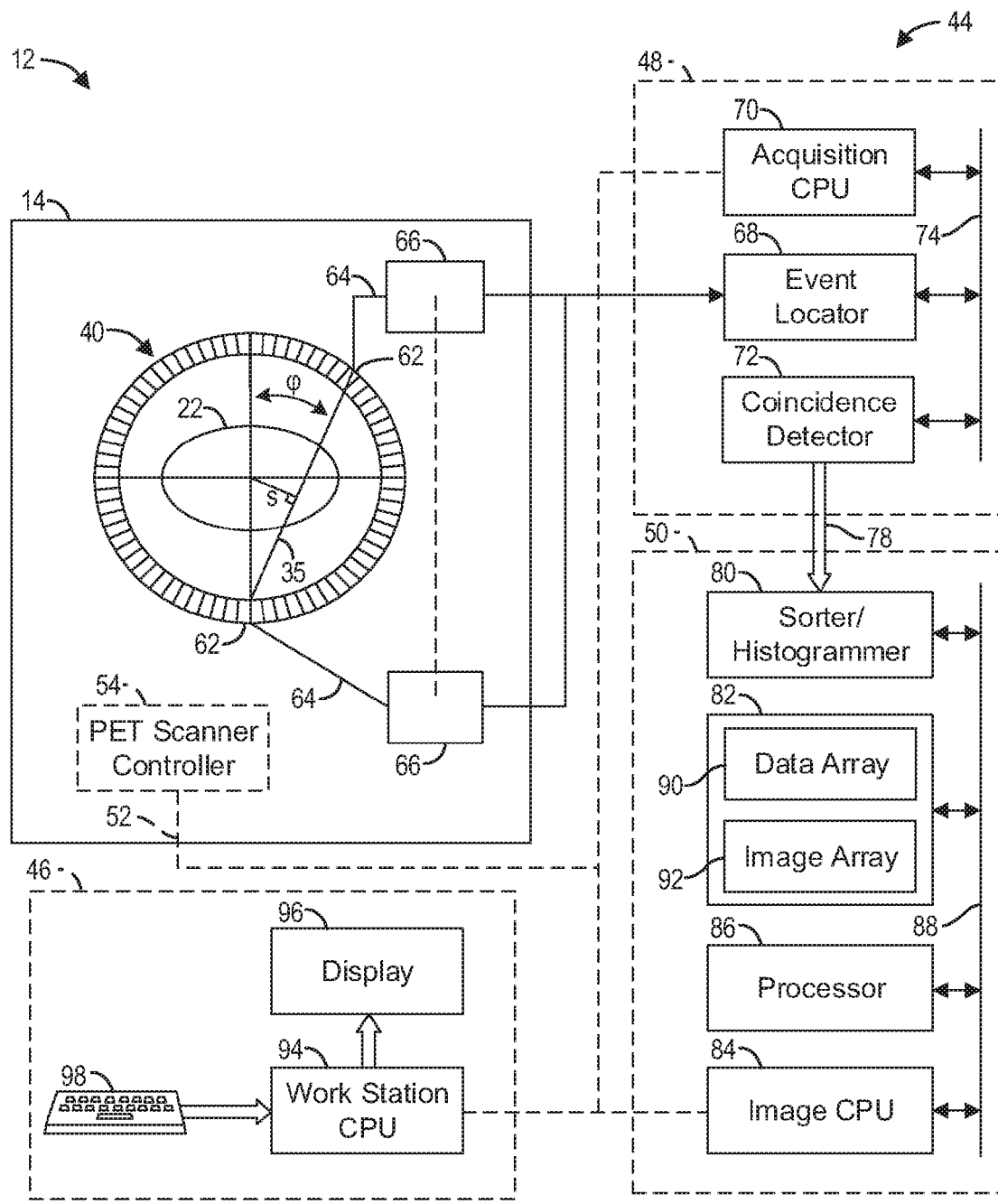
FIG. 2 shows a block schematic diagram illustrating an exemplary imaging system of a first modality.
Figure 3:
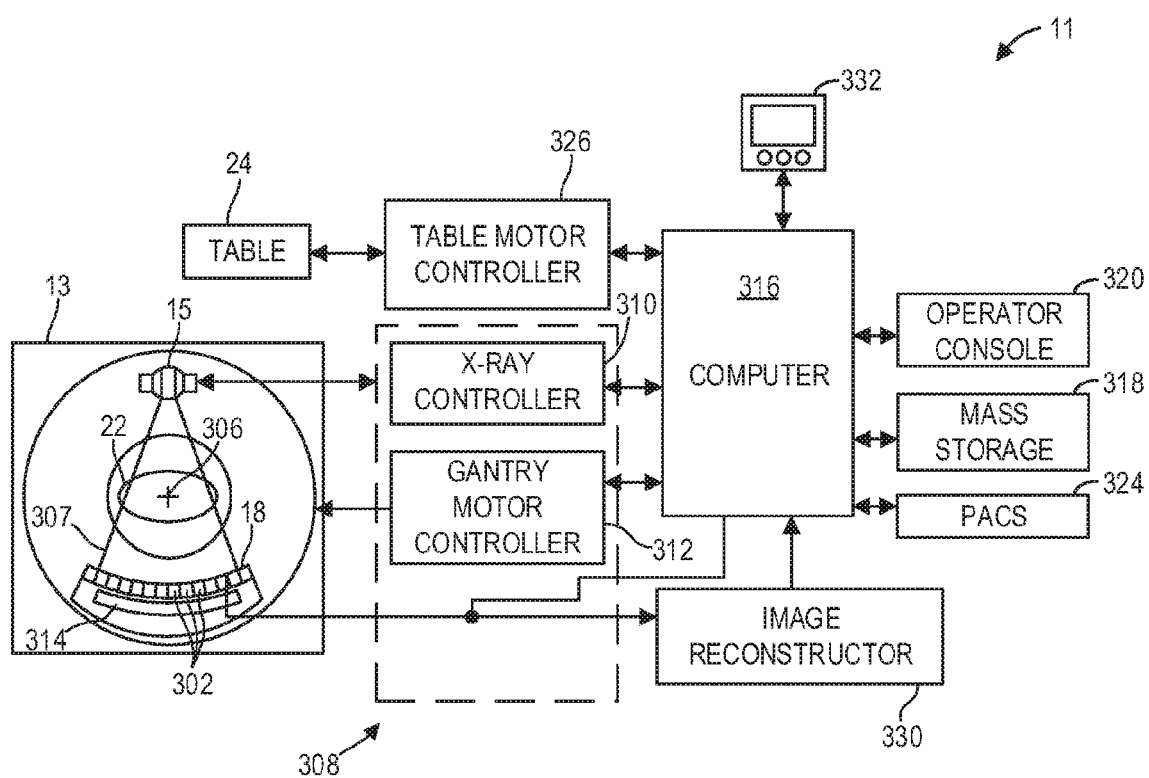
FIG. 3 shows a block schematic diagram illustrating an exemplary imaging system of a second modality.

Various embodiments of the present disclosure provide a multi-modality image system 10 as shown in FIGS. 1-3. Multi-modality imaging system 10 may be any type of imaging system, for example, different types of medical imaging systems, such as a Positron Emission Tomography (PET) imaging system, a Single Photon Emission Computed Tomography (SPECT) imaging system, a Computed Tomography (CT) imaging system, an ultrasound system, a Magnetic Resonance Imaging (MM) system, or any other system capable of generating tomographic images. Moreover, the various embodiments are not limited to medical imaging systems for imaging human subjects, but may include veterinary or non-medical systems for imaging non-human objects.

Referring to FIG. 1, the multi-modality imaging system 10 includes a first modality unit 11 and a second modality unit 12. The two modality units enable the multi-modality imaging system 10 to scan an object or patient in a second modality using the second modality unit 12. The multi-modality imaging system 10 allows for multiple scans in different modalities to facilitate an increased diagnostic capability over single modality systems. In one embodiment, multi-modality imaging system 10 is a Computed Tomography/Positron Emission Tomography (CT/PET) imaging system 10, e.g., the first modality 11 is a CT imaging system 11 and the second modality 12 is a PET imaging system 12. The CT/PET system 10 is shown as including a gantry 13 representative of a CT imaging system and a gantry 14 that is associated with a PET imaging system. As discussed above, modalities other than CT and PET may be employed with the multi-modality imaging system 10.

The gantry 13 includes an x-ray source 15 that projects a beam of x-rays toward a detector array 18 on the opposite side of the gantry 13. Detector array 18 is formed by a plurality of detector rows (not shown) including a plurality of detector elements which together sense the projected x-rays that pass through a medical patient 22. Each detector element produces an electrical signal that represents the intensity of an impinging x-ray beam and hence allows estimation of the attenuation of the beam as it passes through the patient 22. During a scan to acquire x-ray projection data, gantry 13 and the components mounted thereon rotate about a center of rotation.

FIG. 2 is a block schematic diagram of the PET imaging system 12 illustrated in FIG. 1 in accordance with an embodiment of the present disclosure. The PET imaging system 12 includes a detector ring assembly 40 including a plurality of detector crystals. The PET imaging system 12 also includes a controller or processor 44, to control normalization, image reconstruction processes, and perform calibration. Controller 44 is coupled to an operator workstation 46. Controller 44 includes a data acquisition processor 48 and an image reconstruction processor 50, which are interconnected via a communication link 52. PET imaging system 12 acquires scan data and transmits the data to data acquisition processor 48. The scanning operation is controlled from the operator workstation 46. The data acquired by the data acquisition processor 48 is reconstructed using the image reconstruction processor 50.

The detector ring assembly 40 includes a central opening, in which an object or patient, such as patient 22 may be positioned using, for example, a motorized table 24 (shown in FIG. 1). The motorized table 24 is aligned with the central axis of detector ring assembly 40. This motorized table 24 moves the patient 22 into the central opening of detector ring assembly 40 in response to one or more commands received from the operator workstation 46. A PET scanner controller 54, also referred to as the PET gantry controller, is provided (e.g., mounted) within PET system 12. The PET scanner controller 54 responds to the commands received from the operator workstation 46 through the communication link 52. Therefore, the scanning operation is controlled from the operator workstation 46 through PET scanner controller 54.

During operation, when a photon collides with a crystal 62 on a detector ring 40, it produces a scintillation event on the crystal. Each photomultiplier tube or photosensor produces an analog signal that is transmitted on communication line 64 when a scintillation event occurs. A set of acquisition circuits 66 is provided to receive these analog signals. Acquisition circuits 66 produce digital signals indicating the three-dimensional (3D) location and total energy of the event. The acquisition circuits 66 also produce an event detection pulse, which indicates the time or moment the scintillation event occurred. These digital signals are transmitted through a communication link, for example, a cable, to an event locator circuit 68 in the data acquisition processor 48.

The data acquisition processor 48 includes the event locator circuit 68, an acquisition CPU 70, and a coincidence detector 72. The data acquisition processor 48 periodically samples the signals produced by the acquisition circuits 66. The acquisition CPU 370 controls communications on a back-plane bus 74 and on the communication link 52. The event locator circuit 68 processes the information regarding each valid event and provides a set of digital numbers or values indicative of the detected event. For example, this information indicates when the event took place and the position of the scintillation crystal 62 that detected the event. An event data packet is communicated to the coincidence detector 72 through the back-plane bus 74. The coincidence detector 72 receives the event data packets from the event locator circuit 68 and determines if any two of the detected events are in coincidence. Coincidence is determined by a number of factors. First, the time markers in each event data packet must be within a predetermined time period, for example, 12.5 nanoseconds, of each other. Second, the line-of-response (LOR) formed by a straight line joining the two detectors that detect the coincidence event should pass through the field of view in the PET imaging system 12. Events that cannot be paired are discarded. Coincident event pairs are located and recorded as a coincidence data packet that is communicated through a physical communication link 78 to a sorter/histogrammer 80 in the image reconstruction processor 50.

The image reconstruction processor 50 includes the sorter/histogrammer 80. During operation, sorter/histogrammer 80 generates a data structure known as a histogram. A histogram includes a large number of cells, where each cell corresponds to a unique pair of detector crystals in the PET scanner. Because a PET scanner typically includes thousands of detector crystals, the histogram typically includes millions of cells. Each cell of the histogram also stores a count value representing the number of coincidence events detected by the pair of detector crystals for that cell during the scan. At the end of the scan, the data in the histogram is used to reconstruct an image of the patient. The completed histogram containing all the data from the scan is commonly referred to as a "result histogram." The term "histogrammer" generally refers to the components of the scanner, e.g., processor and memory, which carry out the function of creating the histogram.

The image reconstruction processor 50 also includes a memory module 82, an image CPU 84, an array processor 86, and a communication bus 88. During operation, the sorter/histogrammer 80 counts all events occurring along each projection ray and organizes the events into 3D data. This 3D data, or sinogram, is organized in one exemplary embodiment as a data array 90. Data array 90 is stored in the memory module 82. The communication bus 88 is linked to the communication link 52 through the image CPU 84. The image CPU 84 controls communication through communication bus 88. The array processor 86 receives data array 90 as an input and reconstructs images in the form of image array 92. Resulting image arrays 92 are then stored in memory module 82.

The images stored in the image array 92 are communicated by the image CPU 84 to the operator workstation 46. The operator workstation 46 includes a CPU 94, a display 96, and an input device 98. The CPU 94 connects to communication link 52 and receives inputs, e.g., user commands, from the input device 98. The input device 98 may be, for example, a keyboard, mouse, a touch-screen panel, and/or a voice recognition system, and so on. Through input device 98 and associated control panel switches, the operator can control the operation of the PET imaging system 12 and the positioning of the patient 22 for a scan. Similarly, the operator can control the display of the resulting image on the display 96 and can perform image-enhancement functions using programs executed by the workstation CPU 94.

FIG. 3 is a block schematic diagram of the CT imaging system 11 illustrated in FIG. 1 in accordance with an embodiment of the present disclosure. In one embodiment, the CT imaging system 11 includes the detector array 18 (see FIG. 1). The detector array 18 further includes a plurality of detector elements 302 that together sense the x-ray beams 307 that pass through a subject 22 such as a patient to acquire corresponding projection data. Accordingly, in one embodiment, the detector array 18 is fabricated in a multi-slice configuration including the plurality of rows of cells or detector elements 302. In such a configuration, one or more additional rows of the detector elements 302 are arranged in a parallel configuration for acquiring the projection data.

In certain embodiments, the system 11 is configured to traverse different angular positions around the subject 22 for acquiring desired projection data. Accordingly, the gantry 13 and the components mounted thereon may be configured to rotate about a center of rotation 306 for acquiring the projection data, for example, at different energy levels. Alternatively, in embodiments where a projection angle relative to the subject 22 varies as a function of time, the mounted components may be configured to move along a general curve rather than along a segment of a circle.

In one embodiment, the system 11 includes a control mechanism 308 to control movement of the components such as the rotation of the gantry 13 and the operation of the x-ray radiation source 15. In certain embodiments, the control mechanism 308 further includes an x-ray controller 310 configured to provide power and timing signals to the radiation source 15. Additionally, the control mechanism 308 includes a gantry motor controller 312 configured to control a rotational speed and/or position of the gantry 13 based on imaging requirements.

In certain embodiments, the control mechanism 308 further includes a data acquisition system (DAS) 314 configured to sample analog data received from the detector elements 302 and convert the analog data to digital signals for subsequent processing. The data sampled and digitized by the DAS 314 is transmitted to a computing device (also referred to as processor) 316. In one example, the computing device 316 stores the data in a storage device 318. The storage device 318, for example, may include a hard disk drive, a floppy disk drive, a compact disk-read/write (CD-R/W) drive, a Digital Versatile Disc (DVD) drive, a flash drive, and/or a solid-state storage device.

Additionally, the computing device 316 provides commands and parameters to one or more of the DAS 314, the x-ray controller 310, and the gantry motor controller 312 for controlling system operations such as data acquisition and/or processing. In certain embodiments, the computing device 316 controls system operations based on operator input. The computing device 316 receives the operator input, for example, including commands and/or scanning parameters via an operator console 320 operatively coupled to the computing device 316. The operator console 320 may include a keyboard (not shown) or a touchscreen to allow the operator to specify the commands and/or scanning parameters.

Although FIG. 3 illustrates only one operator console 320, more than one operator console may be coupled to the system 11, for example, for inputting or outputting system parameters, requesting examinations, and/or viewing images. Further, in certain embodiments, the system 11 may be coupled to multiple displays, printers, workstations, and/or similar devices located either locally or remotely, for example, within an institution or hospital, or in an entirely different location via one or more configurable wired and/or wireless networks such as the Internet and/or virtual private networks.

In one embodiment, for example, the system 11 either includes, or is coupled to a picture archiving and communications system (PACS) 324. In an exemplary embodiment, the PACS 324 is further coupled to a remote system such as a radiology department information system, hospital information system, and/or to an internal or external network (not shown) to allow operators at different locations to supply commands and parameters and/or gain access to the image data.

The computing device 316 uses the operator-supplied and/or system-defined commands and parameters to operate a table motor controller 326, which in turn, may control a motorized table 24. Particularly, the table motor controller 326 moves the table 24 for appropriately positioning the subject 22 in the gantry 13 for acquiring projection data corresponding to the target volume of the subject 22.

As previously noted, the DAS 314 samples and digitizes the projection data acquired by the detector elements 302. Subsequently, an image reconstructor 330 uses the sampled and digitized x-ray data to perform high-speed reconstruction. Although FIG. 3 illustrates the image reconstructor 330 as a separate entity, in certain embodiments, the image reconstructor 330 may form part of the computing device 316. Alternatively, the image reconstructor 330 may be absent from the system 11 and instead the computing device 316 may perform one or more functions of the image reconstructor 330. Moreover, the image reconstructor 330 may be located locally or remotely, and may be operatively connected to the system 11 using a wired or wireless network. Particularly, one exemplary embodiment may use computing resources in a "cloud" network cluster for the image reconstructor 330.

In one embodiment, the image reconstructor 330 stores the images reconstructed in the storage device 318. Alternatively, the image reconstructor 330 transmits the reconstructed images to the computing device 316 for generating useful patient information for diagnosis and evaluation. In certain embodiments, the computing device 316 transmits the reconstructed images and/or the patient information to a display 332 communicatively coupled to the computing device 316 and/or the image reconstructor 330.

Prior multi-modality imaging systems utilize a dedicated volumetric quality control (VQC) phantom for image alignment. These VQC phantoms typically include a number of radioactive spheres or marbles embedded within the phantom which define a number of points. The VQC phantom is scanned once using both modalities, and any misalignment between the imaging modalities may be identified in the resulting reconstructed images of the VQC phantom. In particular, the positions of the points corresponding to the radioactive spheres in the VQC phantom which appear in the PET image and the CT image, for example, are used to register the images and/or align the PET gantry with the CT gantry. However, VQC phantoms are generally large, expensive, and challenging to maintain and store, which is unnecessarily burdensome considering that VQC phantoms are only occasionally used.

As described further herein, the present disclosure provides for systems and methods for aligning multi-modality imaging system components by using other types of phantoms.

Figure 4A:
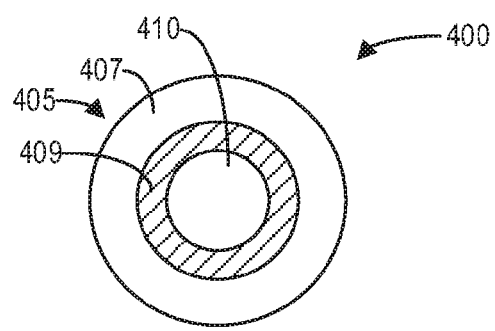
FIGS. 4A-4C show different views of an annulus phantom.
Figure 4B:
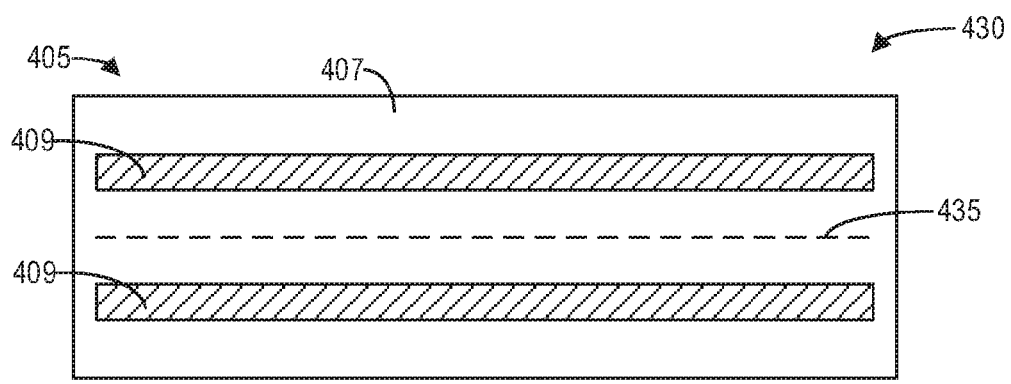
Figure 4C:
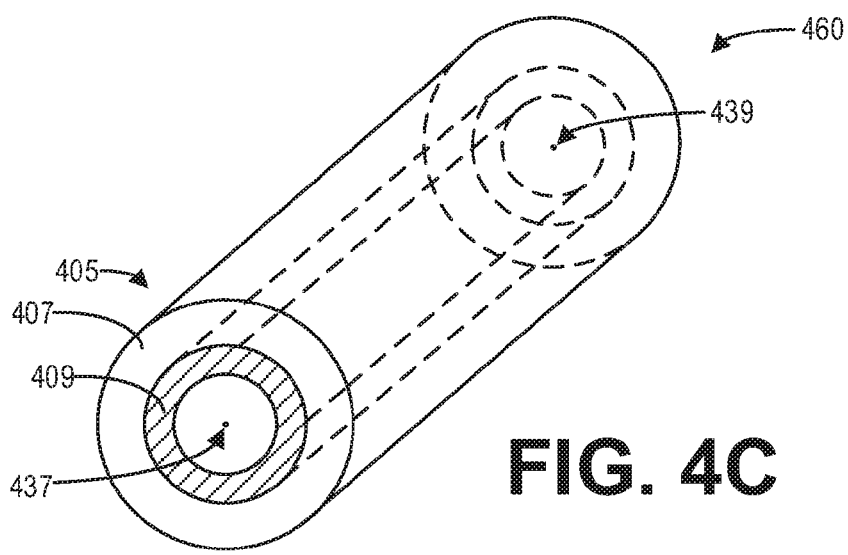

FIGS. 4A-4C illustrate different views of an example annulus phantom 405 in accordance with the present disclosure. In particular, FIG. 4A shows a front cross-sectional view 400 of an example annulus phantom 405, FIG. 4B shows a side cross-sectional view 430 of the example annulus phantom 405, and FIG. 4C shows a front-right perspective view 460 of the example annulus phantom 405. The annulus phantom 405 may typically be utilized for daily quality assurance (DQA) calibrations. As described further herein, the annulus phantom 405 may also be used as a VQC phantom for checking image alignment and imaging system component alignment.

The annulus phantom 405 may comprise a cylinder filled with radioactive isotope, such as germanium-68 ($^{68}$Ge). As depicted, the phantom 405 includes an annular space 409 filled with the radioactive isotope. To that end, the annular space 409 may be filled with an epoxy Ge-68 radioactive resin material. The remainder of the annulus phantom 405 may comprise a plastic polymer, such as acrylonitrile butadiene styrene (ABS) plastic. For example, the radioactive annulus 409 may be enclosed within an outer layer 407 comprising ABS plastic. Further, the interior region 410 within the radioactive annulus 409 may also comprise ABS plastic.

In order to use the annulus phantom 405 for component alignment, multiple points may be identified within an image (e.g., a PET image, a CT image) of the annulus phantom 405. To that end, a center line 435 may be identified within such an image. As depicted, the center line 435 may correspond to the central axis of the radioactive annulus 409. One or more points may be then be selected based on the center line 435. For example, two points 437 and 439 may be identified based on the center line 435. These two points 437 and 439 may correspond to the points on the center line 435 at each end of the radioactive annulus 409.

To accurately align system components and co-register images of different imaging modalities, a plurality of points may be identified. To that end, the annulus phantom 405 may be imaged in multiple orientations using the multiple imaging modalities. Different orientations for imaging the annulus phantom 405 are described further herein with regard to FIGS. 5-7.

Figure 5:
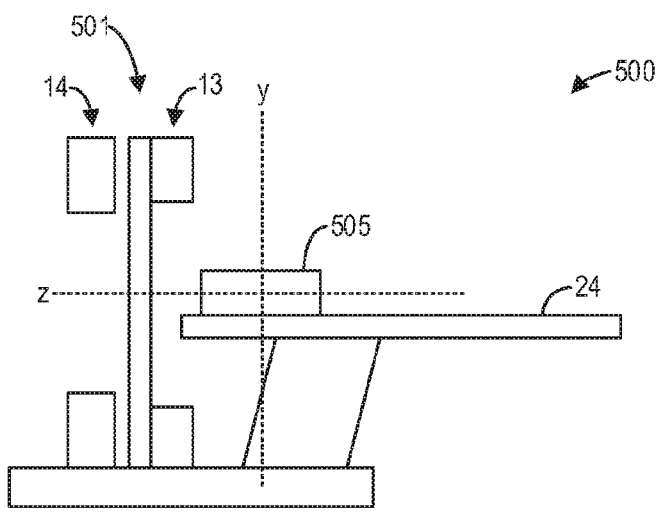
FIG. 5 shows a pictorial view of a first phantom orientation for aligning system components.

FIG. 5 shows a pictorial view of a first phantom orientation 500 for aligning system components. In the first phantom orientation 500, the annulus phantom 505 is on the table 24 with the central axis of the (cylindrical) annulus phantom 505 parallel to the z-axis of the imaging system. The height of the table 24 may be adjusted so that the annulus phantom 505 moves through the isocenter of the gantry or gantries 501 of the imaging system (namely, the CT gantry 13 and the PET gantry 14).

Figure 6:
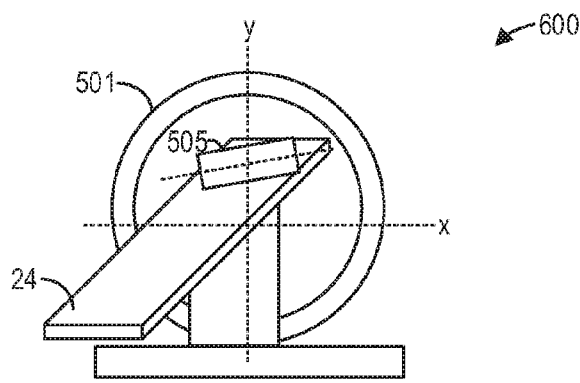
FIG. 6 shows a pictorial view of a second phantom orientation for aligning system components.

FIG. 6 shows a pictorial view of a second phantom orientation 600 for aligning system components. In the second phantom orientation 600, the annulus phantom 505 is positioned on the table 24 with endpoints of the annulus phantom 505 in the first and third quadrants of the xz-plane. The height of the table 24 adjusted to a selected height above isocenter of the gantries 501 in they direction.

Figure 7:
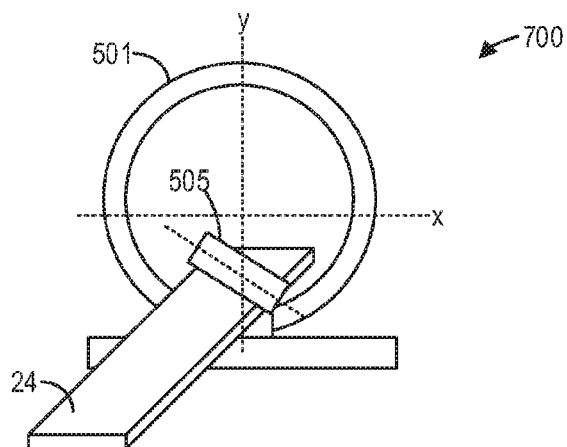
FIG. 7 shows a pictorial view of a third phantom orientation for aligning system components.

FIG. 7 shows a pictorial view of a third phantom orientation 700 for aligning system components. In the third phantom orientation 700, the annulus phantom 505 is positioned on the table 24 with the endpoints of the annulus phantom 505 in the second and fourth quadrants of the xz-plane. The height of the table 24 is adjusted to a selected height below isocenter of the gantries 501 in they direction.

While three particular phantom orientations are described above, it should be appreciated that many such orientations may be used in accordance with the methods disclosed herein without departing from the scope of the present disclosure. Further, while three orientations are described, in some examples the method may be carried out with two orientations, four orientations, five orientations, and so on.

Figure 8:
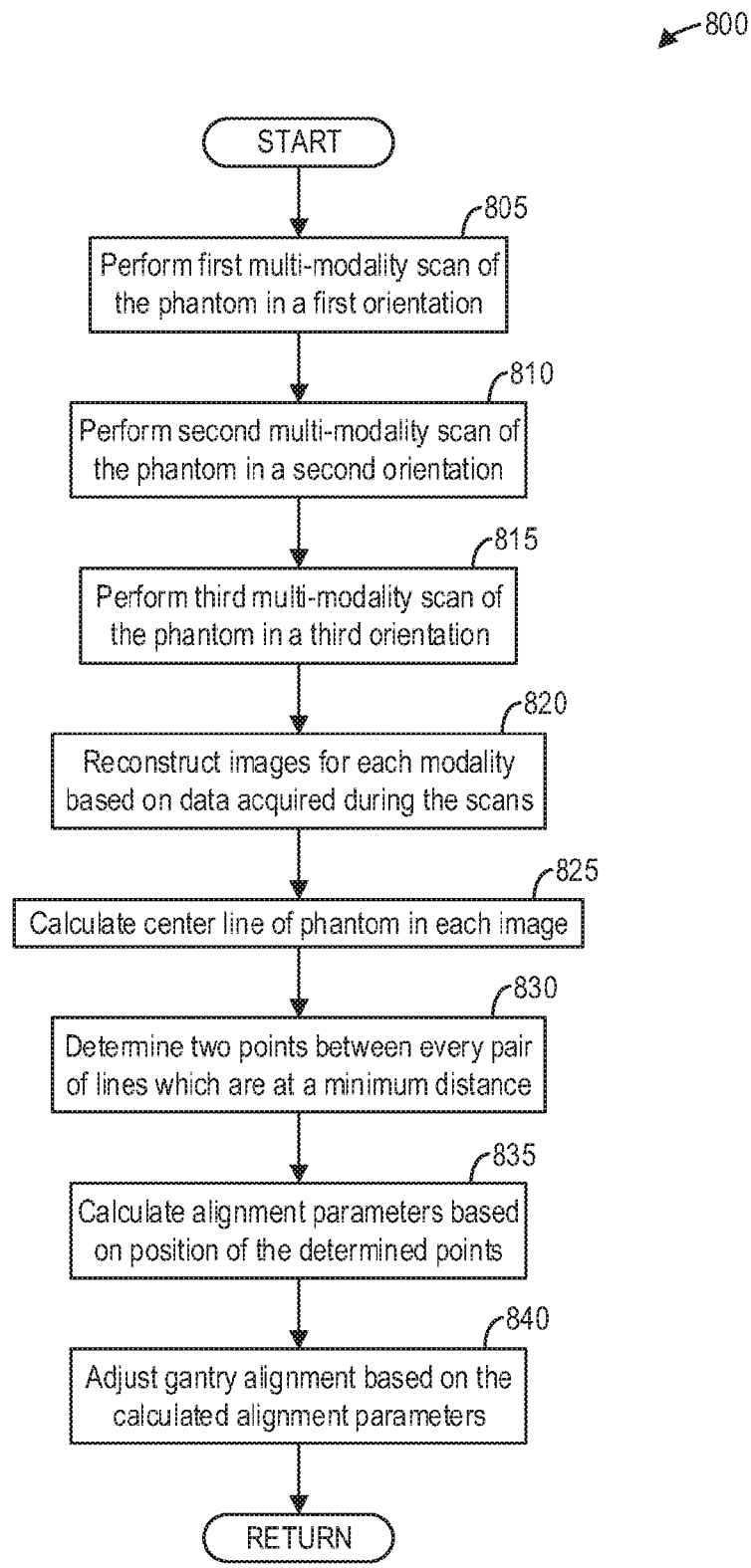
FIG. 8 shows a high-level flow chart illustrating an example method for aligning system components.

FIG. 8 shows a high-level flow chart illustrating an example method 800 for aligning system components. Method 800 may be described with regard to the systems and components depicted in FIGS. 1-3, though it should be understood that the method may be carried out with other systems and components without departing from the scope of the present disclosure. Method 800 may be implemented as executable instructions in a non-transitory memory and executed by a processor, such as the computer 316.

Method 800 begins at 805. At 805, method 800 includes performing a first multi-modality scan of a phantom in a first orientation. Performing a first multi-modality scan of the phantom in a first orientation may comprise scanning the phantom using each modality (e.g., performing both a CT scan and a PET scan of the phantom) while the phantom is positioned in a first orientation. As an example, the first orientation may comprise the phantom placed parallel to the z-axis of the imaging system with the table position near isocenter. Such an orientation is depicted in FIG. 5.

At 810, method 800 includes performing a second multi-modality scan of the phantom in a second orientation. Similar to 805, performing a second multi-modality scan of the phantom in a second orientation may comprise scanning the phantom using each modality (e.g., performing both a CT scan and a PET scan of the phantom) while the phantom is positioned in a second orientation. As an example, the second orientation may comprise the phantom placed with endpoints in the first and third quadrants of the xz-plane with a certain table elevation above isocenter in the y direction. Such an orientation is depicted in FIG. 6.

At 815, method 800 includes performing a third multi-modality scan of the phantom in a third orientation. Similar to 805 and 810, performing a third multi-modality scan of the phantom in a third orientation may comprise scanning the phantom using each modality (e.g., performing both a CT scan and a PET scan of the phantom) while the phantom is positioned in a third orientation. As an example, the third orientation may comprise the phantom placed with endpoints in the second and fourth quadrants of the xz-plane with a certain table elevation below isocenter in the y direction. Such an orientation is depicted in FIG. 7.

It should be appreciated that an operator of the multi-modality imaging system may manually adjust the position of the phantom between each multi-modality scan to achieve each phantom orientation. In some examples, however, the orientation of the phantom may additionally or alternative be adjusted automatically by the imaging system itself. For example, while an operator may rotate the phantom on the table, a table controller may automatically adjust the height of the table to achieve different orientations of the phantom with respect to isocenter (e.g., at isocenter, above isocenter, below isocenter).

Continuing at 820, method 800 includes reconstructing images for each modality based on data acquired during the scans. Thus, at 820, a PET image and a CT image of the annulus phantom is reconstructed at each orientation, resulting in six images of the annulus phantom (three CT images and three PET images). The PET images may be reconstructed without attenuation correction.

At 825, method 800 includes calculating a center line of the phantom in each reconstructed image. For example, the center or center line of the annulus phantom may be determined in terms of xyz coordinates in each slice of the PET and CT images. The center of each circle will fall on the major axis of the annulus phantom.

The center of the annulus phantom is calculated from the circular/elliptical cross-sections in each slice of the reconstructed image. The center of each circle will fall on the major axis of the annulus phantom (ignoring some variation due to noise in the reconstruction and acquisition). If needed, a linear fit can be used to get the major axis of the annulus phantom.

At 830, method 800 includes determining two points between every pair of lines which are at a minimum distance. In particular, consider three major axes of the annulus phantom obtained from three different CT scans of the annulus phantom. The method identifies two points between every pair of lines which are at a minimum distance. A total of six points can thus be obtained in three CT images, and another six points can be obtained in three PET images.

For example, the major axis of the annulus phantom in the ith scan in the CT images can be represented using a vector notation:

$$M_{C,i} = (a_{C,i}, u_{C,i}).$$

Similarly, the major axis of the annulus phantom in the ith scan in the PET images can be represented as:

$$M_{P,i} = (a_{P,i}, u_{P,i}).$$

With perfect PET-CT alignment, these two vectors $M_{C,i}$ and $M_{P,i}$ point in the same direction, or in other words, the two vectors are aligned. However, if there is a certain misalignment between the PET gantry, the CT gantry, and/or the table, then the two vectors are not aligned. The method locates the closest point from one major axis to another within the line set, and these points are uniquely defined in both modalities. The common perpendicular between two major axes defines the closest points between those two scans. This is equivalent to solving the following equations for each pair of scans:

$$a_{C,1x} - a_{C,1x} = -\mu \cdot u_{C,1x} + \lambda \cdot u_{C,2x} + t \cdot w_{C,x}$$

$$a_{C,1y} - a_{C,1y} = -\mu \cdot u_{C,1y} + \lambda \cdot u_{C,2y} + t \cdot w_{C,y}$$

$$a_{C,1z} - a_{C,1z} = -\mu \cdot u_{C,1z} + \lambda \cdot u_{C,2z} + t \cdot w_{C,z}$$

where the major axes in each scan is defined by one point $(a_{C,ix}, a_{C,iy}, a_{C,iz})$ and one vector $(u_{C,ix}, y_{C,iy}, z_{C,iz})$, and where $w = u_{C,2} \times u_{C,1}$. The two points which are at a minimum distance can then be calculated as:

$$R_1 = a_{C,1} + \mu \cdot u_{C,1}$$

$$S_1 = a_{C,2} + \lambda \cdot u_{C,2}$$

The equation is then solved for three line pairs, and six such points in total can be obtained for each modality. These six points may be denoted for CT and PET modalities as, for i ranging from 1 to 3:

$$(x_{C,i} = R_{ix}), (x_{C,i+3} = S_{ix}), (x_{P,i} = R_{ix}), (x_{P,i+3} = S_{ix}),$$

$$(y_{C,i} = R_{iy}), (y_{C,i+3} = S_{iy}), (y_{P,i} = R_{iy}), (y_{P,i+3} = S_{iy}),$$

$$(z_{C,i} = R_{iz}), (z_{C,i+3} = S_{iz}), (z_{P,i} = R_{iz}), (z_{P,i+3} = S_{iz}),$$

These six points can then be inserted into a transformation matrix to obtain eight alignment parameters as described herein below.

At 835, method 800 includes calculating alignment parameters based on the position of the determined points. In one embodiment, the method includes taking a set of points identified in a CT image at coordinates ($x_{C,i}$, $y_{C,i}$, $z_{C,i}$), where $i \in [1, N]$, and the corresponding points ($x_{P,i}$, $y_{P,i}$, $z_{P,i}$), where $i \in [1, N]$, identified in a single-frame PET image, and computing a set of eight alignment parameters: $P_x$ representing PET-to-table gantry linear misalignment in x (+x to right); $P_y$ representing PET-to-table gantry linear misalignment in y (+y downward); $P_z$ representing PET-to-table gantry linear misalignment in z (+z away from table); $\alpha_P$ representing PET-to-table gantry tilt (+a top rotated forward); $\beta_P$ representing PET-to-table gantry yaw (+(right side forward); $\gamma_P$ representing PET-to-table (and CT) gantry roll (+γ clockwise viewed from front); $\beta_C$ representing CT-to-table gantry yaw (+β right side forward); and $\alpha_C$ representing CT-to-table gantry tilt (+α rotated forward).

These alignment parameters are depicted in FIGS. 9-11. In particular, FIG. 9 shows a top view 900 of the multi-modality imaging system 10, and illustrates the linear alignment parameters (via the x-y-z coordinate system) as well as the rotational alignment parameters $\beta_C$ and $\beta_P$ described above. FIG. 10 shows a right-side view 1000 of the multi-modality imaging system 10, and further illustrates the linear alignment parameters (via the x-y-z coordinate system) as well as the rotational alignment parameters $\alpha_P$ and $\alpha_T$ described above. FIG. 11 shows a front view 1100 of the multi-modality imaging system 10, and further illustrates the rotational alignment parameter $\gamma_P$ described above.

The algorithm has inputs that are matched CT-PET coordinate pairs (i.e., a collection of points $(x_{C,i}, y_{C,i}, z_{C,i})$ in CT image space matched to the corresponding points $(x_{P,i}, y_{P,i}, z_{P,i})$ in PET image space), and has an output that is a set of the eight alignment parameters described above.

In one embodiment, the method includes computing sums of the following over all N point pairs: $x_P$, $y_P$, $z_P$, $x_P y_P$, $x_P z_P$, $y_P z_P$, $(x_P)^2$, $(y_P)^2$, $(z_P)^2$, $x_P y_C x_P z_C y_P z_C$, $x_C y_P$, $x_C z_P$, and $y_C z_P$, and populating a transition matrix T:

$$T \leftarrow$$

$$\begin{pmatrix} N & 0 & 0 & 0 & 0 & -\sum z_P & -\sum y_P & 0 & 0 \\ 0 & N & 0 & \sum z_P & 0 & \sum x_P & 0 & 0 \\ 0 & 0 & N & -\sum y_P & \sum x_P & 0 & \sum x_P & -\sum y_P \\ 0 & \sum z_P & -\sum y_P & \sum y_P^2 + \sum z_P^2 & -\sum x_P y_P & \sum x_P z_P & -\sum x_P y_P & \sum y_P^2 \\ -\sum z_P & 0 & \sum x_P & -\sum x_P y_P & \sum x_P^2 + \sum z_P^2 & \sum y_P z_P & \sum x_P^2 & -\sum x_P y_P \\ -\sum y_P & \sum x_P & 0 & \sum x_P z_P & \sum y_P z_P & \sum x_P^2 + \sum y_P^2 & 0 & 0 \\ 0 & 0 & \sum x_P & -\sum x_P y_P & \sum x_P^2 & 0 & \sum x_P^2 & -\sum x_P y_P \\ 0 & 0 & -\sum y_P & \sum y_P^2 & -\sum x_P y_P & 0 & -\sum x_P y_P & \sum y_P^2 \end{pmatrix}$$

The transition matrix T is used to calculate the alignment parameters in accordance with the following Equation 1:

$$\begin{pmatrix} \sum x_C - x_P \\ \sum y_C - y_P \\ \sum z_C - z_P \\ \sum z_P y_C - y_P z_C \\ \sum x_P z_C - z_P x_C \\ \sum x_P y_C - y_P x_C \\ \sum x_P z_C - x_P z_P \\ \sum z_P y_P - y_P z_C \end{pmatrix} = T \cdot \begin{pmatrix} P_x \\ P_y \\ P_z \\ \alpha_P \\ \beta_P \\ \gamma_P \\ \beta_C \\ \alpha_C \end{pmatrix}$$

In one embodiment, the method includes computing the inverse of the matrix T, i.e., $T^{-1}$. In an alternative embodiment, the inverse is not calculated, rather Equation 1 above is solved directly by a means such as Gaussian elimination.

In the embodiment using the matrix inverse $T^{-1}$, the method includes calculating the alignment parameters in accordance with the following Equation 2:

$$\begin{pmatrix} P_x \\ P_y \\ P_z \\ \alpha_P \\ \beta_P \\ \gamma_P \\ \beta_C \\ \alpha_C \end{pmatrix} \leftarrow T^{-1} \cdot \begin{pmatrix} \sum x_C - x_P \\ \sum y_C - y_P \\ \sum z_C - z_P \\ \sum z_P y_C - y_P z_C \\ \sum x_P z_C - z_P x_C \\ \sum x_P y_C - y_P x_C \\ \sum x_P z_C - x_P z_P \\ \sum z_P y_P - y_P z_C \end{pmatrix}$$

The above method was derived using small angle approximations such as x=sin x and 1=cos x, and sometimes the result is inaccurate because of the approximations. In cases where the above method yields an inaccurate result, the following two-step method is useful to improve accuracy. The two-step method is to use the above method to generate outputs $P_{x,0}$, $P_{y,0}$, $P_{z,0}$, $\alpha_{P,0}$, $\beta_{P,0}$, $\gamma_{P,0}$, $\beta_{C,0}$, and $\alpha_{C,0}$. Then an updated set of CT points $(x_C', y_C', z_C')$ are generated in accordance with:

$$\begin{pmatrix} x_C' \\ y_C' \\ z_C' \\ 1 \end{pmatrix} = \begin{pmatrix} \cos\beta_{C,0} & \sin\alpha_{C,0}\cos\beta_{C,0} & 0 & 0 \\ 0 & \cos\alpha_{C,0} & 0 & 0 \\ -\sin\beta_{C,0} & \sin\alpha_{C,0}\cos\beta_{C,0} & 1 & 0 \\ 0 & 0 & 0 & 1 \end{pmatrix} \begin{pmatrix} x_C \\ y_C \\ z_C \\ 1 \end{pmatrix}$$

An updated set of PET points is similarly generated according to:

$$\begin{pmatrix} x_P' \\ y_P' \\ z_P' \\ 1 \end{pmatrix} = \begin{pmatrix} 1 & 0 & 0 & 0 \\ 0 & \cos\alpha_{P,0} & \sin\alpha_{P,0} & 0 \\ 0 & -\sin\alpha_{P,0} & \cos\alpha_{P,0} & 0 \\ 0 & 0 & 0 & 1 \end{pmatrix} \begin{pmatrix} \cos\beta_{P,0} & 0 & -\sin\beta_{P,0} & 0 \\ 0 & 1 & 0 & 0 \\ \sin\beta_{P,0} & 0 & \cos\beta_{P,0} & 0 \\ 0 & 0 & 0 & 1 \end{pmatrix}$$

$$\begin{pmatrix} \cos\gamma_{P,0} & \sin\gamma_{P,0} & 0 & 0 \\ \sin\gamma_{P,0} & \cos\gamma_{P,0} & 0 & 0 \\ 0 & 0 & 1 & 0 \\ 0 & 0 & 0 & 1 \end{pmatrix} \begin{pmatrix} 0 & 0 & 0 & P_{x,0} \\ 0 & 1 & 0 & P_{y,0} \\ 0 & 0 & 1 & P_{z,0} \\ 0 & 0 & 0 & 1 \end{pmatrix} \begin{pmatrix} x_P \\ y_P \\ z_P \\ 1 \end{pmatrix}$$

Using Equation 1 with $(x_C', y_C', z_C')$–$(x_P', y_P', z_P')$ as inputs yields outputs of $P_{x,1}, P_{y,1}, P_{z,1}, \alpha_{P,1}, \beta_{P,1}, \gamma_{P,1}, \beta_{C,1}$, and $\alpha_{C,1}$. The final alignment parameters are then:

$$\begin{pmatrix} P_x \\ P_y \\ P_z \\ \alpha_P \\ \beta_P \\ \gamma_P \\ \beta_C \\ \alpha_C \end{pmatrix} = \begin{pmatrix} P_{x,0} \\ P_{y,0} \\ P_{z,0} \\ \alpha_{P,0} \\ \beta_{P,0} \\ \gamma_{P,0} \\ \beta_{C,0} \\ \alpha_{C,0} \end{pmatrix} + \begin{pmatrix} P_{x,1} \\ P_{y,1} \\ P_{z,1} \\ \alpha_{P,1} \\ \beta_{P,1} \\ \gamma_{P,1} \\ \beta_{C,1} \\ \alpha_{C,1} \end{pmatrix}$$

At 840, method 800 includes adjusting gantry alignment based on the calculated alignment parameters. The parameters inform a user or an installer of imaging system 10 as to a table alignment status (i.e., whether or not the table is misaligned with either the first modality unit or the second modality unit, or more typically, both units because the units are substantially aligned to each other). Specifically, $\alpha_T$ and $\beta_T$ are utilized to align the table, and the other six parameters are used to align the CT unit with the PET unit. The installer can then re-align the table (e.g., adjust the axis of the table) with the gantry of the imaging system and repeat the herein described methods to verify if the re-aligned system is misaligned or not. Additionally, besides adjusting the table axis, an installer can adjust some aspects of alignment through software. For example, the PET gantry roll can be corrected in the reconstruction methods.

Additionally or alternatively, the controller may automatically adjust positions of the CT gantry and/or the PET gantry and/or the table to align the imaging system components based on the calculated alignment parameters as described above. For example, the controller may command the gantry motor controller and/or the table motor controller to adjust positions of one or more of the gantries and/or the table based on the calculated alignment parameters. Further, the controller may automatically adjust one or more parameters of an image reconstruction algorithm based on the plurality of alignment parameters.

After adjusting gantry and table alignment, method 800 may end. In some examples, method 800 returns to 805, so that the updated alignment of the imaging system components may be evaluated. In this way, method 800 may be repeated until the imaging system components are aligned as desired.

A technical effect of the disclosure is the alignment of gantries of first and second imaging modality units. Another technical effect of the disclosure is the scanning of an annulus phantom in three orientations with two imaging modality units. Yet another technical effect of the disclosure is the alignment of a table based on a plurality of scans of an annulus phantom. Another technical effect of the disclosure is the adjustment of an image reconstruction parameter based on a calculated alignment parameter. A technical effect of the disclosure is the reconstruction of an image with an adjusted image reconstruction parameter, where the adjustment of the image reconstruction parameter is based on a calculated misalignment of imaging system components.

In one embodiment, a method comprises: performing a plurality of scans of an object with a first modality and a second modality, wherein the object is positioned in a different orientation in each of the plurality of scans; calculating a plurality of alignment parameters of a first modality unit and a second modality unit based on the plurality of scans; and adjusting alignment of the first modality unit and the second modality unit based on the plurality of alignment parameters.

In a first example of the method, the object comprises an annulus phantom. In a second example of the method optionally including the first example, the object is positioned in a first, second, and third orientation during the plurality of scans. In a third example of the method optionally including one or more of the first and second examples, the method further comprises reconstructing a plurality of pairs of images based on data acquired during the plurality of scans. In a fourth example of the method optionally including one or more of the first through third examples, calculating the plurality of alignment parameters comprises calculating positions of points in the object in each image of the plurality of pairs of images, and calculating the plurality of alignment parameters based on the positions of the points. In a fifth example of the method optionally including one or more of the first through fourth examples, calculating the positions of the points comprises calculating a center line of the object in each image of the plurality of pairs of images. In a sixth example of the method optionally including one or more of the first through fifth examples, calculating the positions of the points further comprises determining two points between each pair of center lines which are at a minimum distance.

In another embodiment, a method comprises: scanning, with a first imaging modality unit and a second imaging modality unit, an object positioned in a first orientation; scanning, with the first imaging modality unit and the second imaging modality unit, the object positioned in a second orientation; scanning, with the first imaging modality unit and the second imaging modality unit, the object positioned in a third orientation; reconstructing images of the object in each of the orientations using data acquired during the scans; and determining an alignment of the first imaging modality unit and the second imaging modality unit based on the reconstructed images.

In a first example of the method, the object comprises an annulus phantom or any phantom from which a center line can be extracted with both modality scans. In a second example of the method optionally including the first example, the method further comprises adjusting a physical position of one or more of a first gantry of the first imaging modality unit and a second gantry of the second imaging modality unit based on the determined alignment. In a third example of the method optionally including one or more of the first and second examples, the method further comprises adjusting a reconstruction of images based on the determined alignment. In a fourth example of the method optionally including one or more of the first through third examples, the first imaging modality unit comprises a computed tomography imaging system and the second imaging modality unit comprises a positron emission tomography imaging system. In a fifth example of the method optionally including one or more of the first through fourth examples, determining the alignment based on the reconstructed images comprises calculating a center line of the object in each of the reconstructed images, determining two points between each pair of the center lines, and calculating alignment parameters based on positions of the determined points.

In yet another embodiment, a system comprises: a first modality unit comprising a bore therethrough; a second modality unit comprising a bore therethrough; a table positioned to move at least partially through the first modality unit bore and the second modality unit bore; and a computer communicatively coupled to the first and second modality units, the computer configured with executable instructions in non-transitory memory that when executed cause the computer to: perform a plurality of scans of an object with the first modality unit and the second modality unit, wherein the object is positioned on the table in a different orientation during each of the plurality of scans; calculate a plurality of alignment parameters based on images of the object reconstructed from data acquired during the plurality of scans; and adjust an alignment of the first modality unit to the second modality unit based on the plurality of alignment parameters.

In a first example of the system, the computer is further configured with executable instructions in the non-transitory memory that when executed cause the computer to adjust an alignment of the table based on the plurality of alignment parameters. In a second example of the system optionally including the first example, adjusting the alignment based on the plurality of alignment parameters comprises adjusting a physical positioning of one or more of the first modality unit and the second modality unit based on the plurality of alignment parameters. In a third example of the system optionally including one or more of the first and second examples, adjusting the alignment based on the plurality of alignment parameters comprises adjusting one or more parameters of an image reconstruction algorithm based on the plurality of alignment parameters. In a fourth example of the system optionally including one or more of the first through third examples, the plurality of scans comprises at least a first scan, a second scan, and a third scan. In a fifth example of the system optionally including one or more of the first through fourth examples, the object comprises an annulus phantom. In a sixth example of the system optionally including one or more of the first through fifth examples, the computer is further configured with executable instructions in the non-transitory memory that when executed cause the computer to perform daily quality assurance calibrations based on a scan of the annulus phantom.

Note that the example control and estimation routines included herein can be used with various imaging systems and/or imaging system modalities. The control methods and routines disclosed herein may be stored as executable instructions in non-transitory memory and may be carried out by the control system including the controller in combination with the various sensors, actuators, and other hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various imaging system hardware components in combination with the electronic controller.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
controlling a first modality unit and a second modality unit to perform a plurality of scans, including a first scan with the first modality unit and the second modality unit and a second scan with the first modality unit and the second modality unit, of an object, wherein the object is positioned in a first orientation during the first scan and a second orientation during the second scan, wherein the first modality unit and the second modality unit respectively comprise a positron emission tomography (PET) imaging system and a computed tomography (CT) imaging system;
calculating a plurality of alignment parameters of the first modality unit and the second modality unit based on images reconstructed from data acquired during the plurality of scans; and
adjusting alignment of the first modality unit and the second modality unit based on the plurality of alignment parameters.

2. The method of claim 1, wherein the object comprises an annulus phantom.

3. The method of claim 1, wherein the object is further positioned in a third orientation during the plurality of scans.

4. The method of claim 1, further comprising reconstructing a plurality of pairs of images based on the data acquired during the plurality of scans, wherein the images comprise the plurality of pairs of images.

5. The method of claim 4, wherein calculating the plurality of alignment parameters comprises calculating positions of points in the object in each image of the plurality of pairs of images, and calculating the plurality of alignment parameters based on the positions of the points.

6. The method of claim 5, wherein calculating the positions of the points comprises calculating a center line of the object in each image of the plurality of pairs of images.

7. The method of claim 6, wherein calculating the positions of the points further comprises determining two points between each pair of center lines which are at a minimum distance.

8. A method, comprising:
scanning, with a first imaging modality unit and a second imaging modality unit, an object positioned in a first orientation, wherein the first imaging modality unit and the second imaging modality unit respectively comprise a computed tomography (CT) imaging system and a positron emission tomography (PET) imaging system;
scanning, with the first imaging modality unit and the second imaging modality unit, the object positioned in a second orientation;
scanning, with the first imaging modality unit and the second imaging modality unit, the object positioned in a third orientation;
reconstructing images of the object in each of the orientations using data acquired during the scans; and
determining an alignment of the first imaging modality unit and the second imaging modality unit based on the reconstructed images.

9. The method of claim 8, wherein the object comprises an annulus phantom.

10. The method of claim 8, further comprising adjusting a physical position of one or more of a first gantry of the first imaging modality unit and a second gantry of the second imaging modality unit based on the determined alignment.

11. The method of claim 8, further comprising adjusting a reconstruction of images based on the determined alignment.

12. The method of claim 8, wherein determining the alignment based on the reconstructed images comprises calculating a center line of the object in each of the reconstructed images, determining two points between each pair of the center lines, and calculating alignment parameters based on positions of the determined points.

13. A system, comprising:
a first modality unit comprising a bore therethrough, the first modality unit comprising a positron emission tomography (PET) imaging system;
a second modality unit comprising a bore therethrough, the second modality unit comprising a computed tomography (CT) imaging system;
a table positioned to move at least partially through the first modality unit bore and the second modality unit bore; and
a computer communicatively coupled to the first and second modality units, the computer configured with executable instructions in non-transitory memory that when executed cause the computer to:
control the first modality unit and the second modality unit to perform a first scan of an object positioned on the table in a first orientation;
control the first modality unit and the second modality unit to perform a second scan of the object positioned on the table in a second orientation;
reconstruct a first set of images from data acquired during the first scan and a second set of images from data acquired during the second scan;
calculate a plurality of alignment parameters based on the first set of images and the second set of images; and
adjust an alignment of the first modality unit to the second modality unit based on the plurality of alignment parameters.

14. The system of claim 13, wherein the computer is further configured with executable instructions in the non-transitory memory that, when executed, cause the computer to adjust an alignment of the table based on the plurality of alignment parameters.

15. The system of claim 13, wherein adjusting the alignment based on the plurality of alignment parameters comprises controlling a gantry motor controller of one or more of the first modality unit and the second modality unit to adjust a physical positioning of one or more of the first modality unit and the second modality unit based on the plurality of alignment parameters.

16. The system of claim 13, wherein adjusting the alignment based on the plurality of alignment parameters comprises adjusting one or more parameters of an image reconstruction algorithm based on the plurality of alignment parameters.

17. The system of claim 13, wherein the computer is further configured with instructions in non-transitory memory that, when executed, cause the computer to control the first modality unit and the second modality unit to perform a third scan of the object positioned on the table in a third orientation and reconstruct a third set of images from data acquired during the third scan, wherein the plurality of alignment parameters is further calculated based on the third set of images.

18. The system of claim 13, wherein the object comprises an annulus phantom.

19. The system of claim 18, wherein the computer is further configured with executable instructions in the non-transitory memory that, when executed, cause the computer to perform daily quality assurance calibrations based on a scan of the annulus phantom.

* * * * *